(12) United States Patent
Moorman et al.

(10) Patent No.: US 7,736,264 B2
(45) Date of Patent: Jun. 15, 2010

(54) EIGHT SPEED AUTOMATIC TRANSMISSION WITH DUAL AREA CLUTCH PISTON

(75) Inventors: Steven P. Moorman, Dexter, MI (US); John E. Marano, Milford, MI (US); Andrew W. Phillips, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 442 days.

(21) Appl. No.: 11/862,376

(22) Filed: Sep. 27, 2007

(65) Prior Publication Data

US 2008/0305911 A1 Dec. 11, 2008

Related U.S. Application Data

(60) Provisional application No. 60/942,690, filed on Jun. 8, 2007.

(51) Int. Cl.
*F16H 3/62* (2006.01)
(52) U.S. Cl. .................................. 475/277; 475/288
(58) Field of Classification Search .................. 475/271, 475/275, 277, 282, 288, 296, 311, 317
See application file for complete search history.

(56) References Cited

U.S. PATENT DOCUMENTS

| 4,683,776 A | * | 8/1987 | Klemen ....................... 475/286 |
| 4,875,561 A | | 10/1989 | Schneider et al. |
| 7,104,380 B2 | | 9/2006 | Bishop et al. |
| 2004/0082428 A1 | * | 4/2004 | Benedict Usoro et al. ... 475/296 |
| 2008/0015080 A1 | * | 1/2008 | Kamm et al. ................ 475/275 |

* cited by examiner

*Primary Examiner*—Sherry L. Estremsky
*Assistant Examiner*—Edwin A. Young
(74) *Attorney, Agent, or Firm*—Quinn Law Group, PLLC

(57) ABSTRACT

A transmission includes four planetary gearsets and five torque transmitting devices operative to provide eight forward speed ratios. At least one of the torque transmitting devices is engaged during two different speed ratios. The torque transmitting device includes a piston partially defining two separate and independently pressurizable chambers. Accordingly, the transmission enables both chambers to be pressurized for speed ratios in which a high torque capacity is required of the torque transmitting device, and only one of the chambers to be pressurized for speed ratios in which a low torque capacity is required of the torque transmitting device.

8 Claims, 3 Drawing Sheets

| Torque Transmitting Device | Max Torque (Nm) | | | | | | | | |
|---|---|---|---|---|---|---|---|---|---|
| | Rev | 1st | 2nd | 3rd | 4th | 5th | 6th | 7th | 8th |
| 116 | 1617 | 1070 | 423 | 0 | 0 | 0 | 0 | 96 | 215 |
| 120 | 2696 | 2184 | 1466 | 997 | 603 | 240 | 0 | 0 | 0 |
| 108 | 0 | 0 | 604 | 999 | 479 | 0 | 317 | 0 | 285 |
| 104 | 0 | 900 | 0 | 588 | 0 | 542 | 900 | 362 | 0 |
| 112 | 1111 | 0 | 0 | 0 | 230 | 443 | 583 | 362 | 285 |

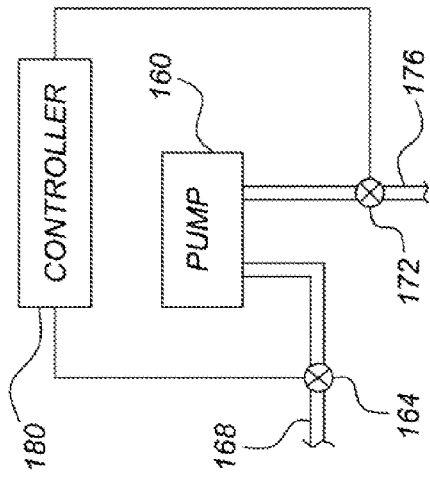
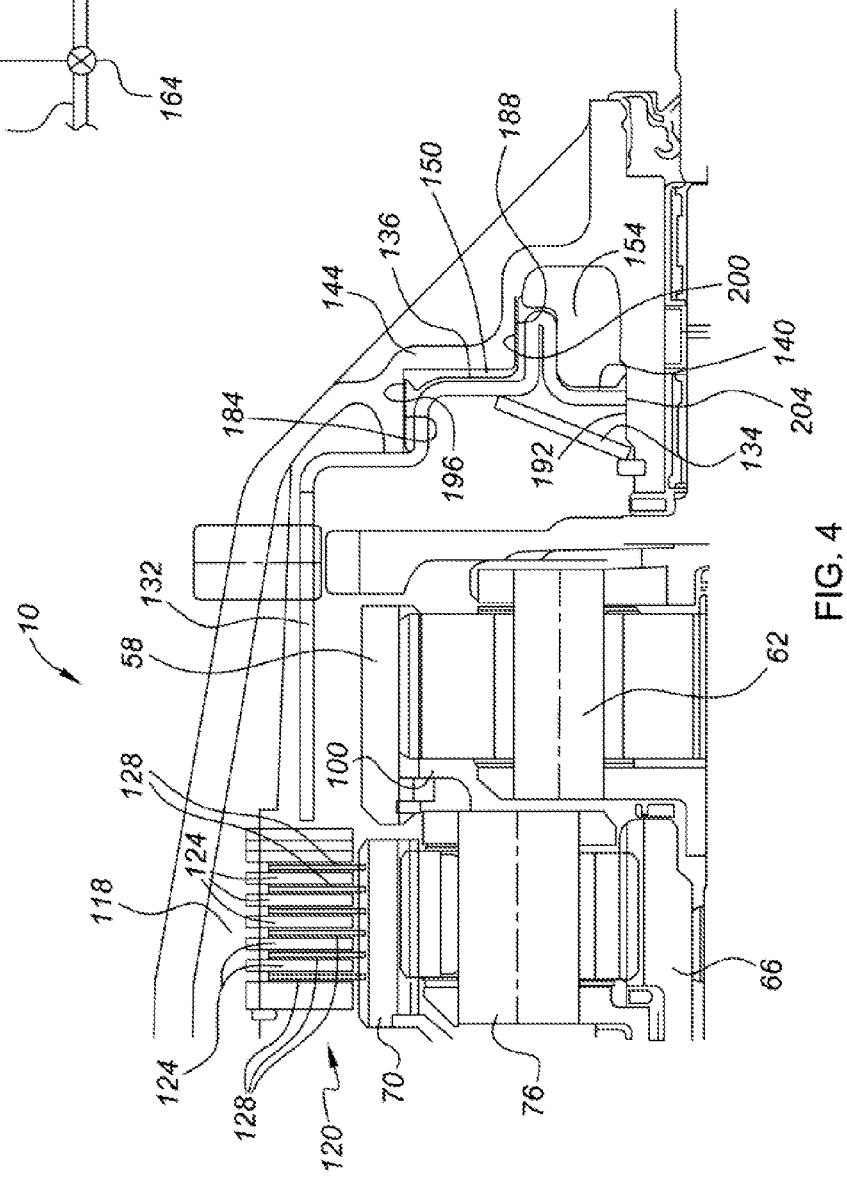

EIGHT SPEED AUTOMATIC TRANSMISSION WITH DUAL AREA CLUTCH PISTON

CROSS REFERENCE TO RELATED APPLICATION

This application claims the benefit of U.S. Provisional Application Ser. No. 60/942,690, filed Jun. 8, 2007, and which is hereby incorporated by reference in its entirety.

TECHNICAL FIELD

This invention relates to transmissions having planetary gear arrangements, torque transmitting devices for selectively coupling members of the planetary gear arrangements to other members, and pistons partially defining separate pressure chambers for actuating the torque transmitting devices.

BACKGROUND OF THE INVENTION

Certain multi-speed transmissions are characterized by differences in the amount of torque a clutch is subjected to in various gear states. The torque capacity of a clutch is, at least in part, determined by the axial force exerted on the clutch plates and discs by a hydraulically actuated piston. The force of the piston is determined by the pressure of the hydraulic fluid and the surface area of the piston exposed to the hydraulic fluid. Thus, the surface area of a clutch piston exposed to hydraulic pressure must be sized to produce the amount of axial force necessary for the highest torque condition of the clutch.

A clutch with a large torque capacity has a large gain between hydraulic pressure exerted on the piston and clutch torque. Small errors in pressure control may result in large clutch torque errors. In speed ratios with lower mechanical gains, the resulting clutch torque errors can be a significant percentage of the total torque required to complete a shift.

SUMMARY OF THE INVENTION

A transmission includes an input member, an output member, a stationary member, and first, second, third, and fourth planetary gearsets. Each of the gearsets has respective first, second, and third members. The first member of the first planetary gearset is continuously operatively connected to the first component of the second planetary gearset for unitary rotation. The second member of the second planetary gearset is continuously operatively connected to the second member of the third planetary gearset for unitary rotation. The third member of the first planetary gearset is continuously operatively connected to the third member of the fourth planetary gearset for unitary rotation. The first member of the third planetary gearset is continuously operatively connected to the first member of the fourth planetary gearset for unitary rotation.

The second member of the first planetary gearset is continuously operatively connected to the input member for unitary rotation. The second member of the third planetary gearset is continuously operatively connected to the output member for unitary rotation.

The transmission also includes first, second, third, fourth, and fifth torque transmitting devices that are operative to selectively connect members of the planetary gearsets with the input member, the stationary member, or with other members of the planetary gearsets to provide at least eight forward speed ratios. At least one of the torque transmitting devices includes a piston that partially defines two separate pressure chambers and that is selectively moveable in response to hydraulic pressure in the pressure chambers.

The transmission provided herein improves upon the prior art because, where a relatively high amount of torque capacity is required by one of the torque transmitting devices, both chambers of the piston may be pressurized to provide the required torque capacity. Where a relatively low amount of torque capacity is required by the torque transmitting device, only one of the chambers may be pressurized, thereby reducing the amount of torque disturbance resulting from pressure errors.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic side view of a portion of the transmission of FIGS. 1 and 2, including one of the torque transmitting devices; and FIG. 4a is a schematic depiction of a pump and a portion of a hydraulic circuit of the transmission.

DESCRIPTION OF THE PREFERRED EMBODIMENTS

Figure 1:
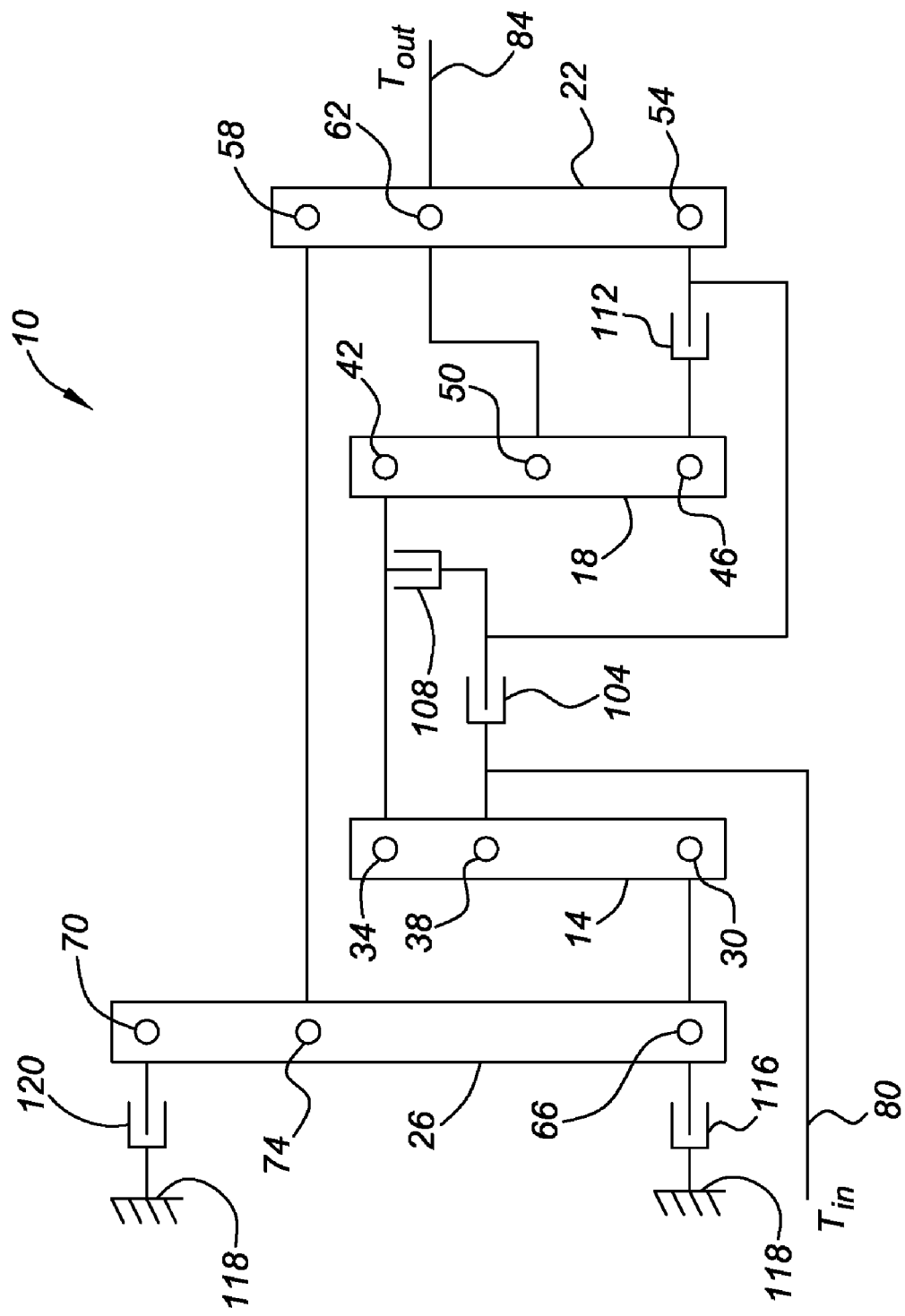
FIG. 1 shows a lever diagram of a transmission in accordance with the invention.
Figures 2, 3:
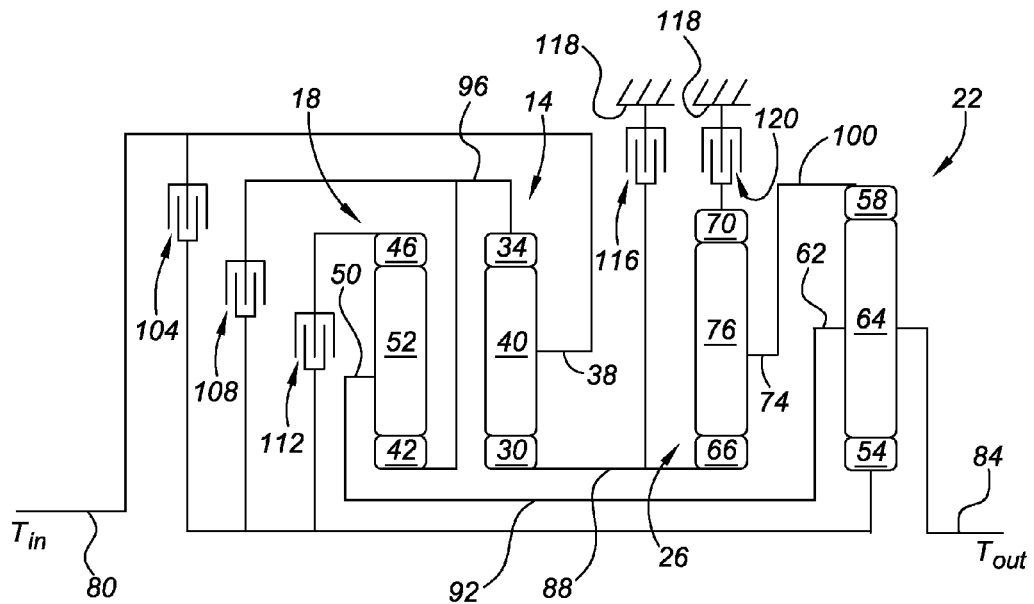
FIG. 2 shows a stick diagram corresponding with the lever diagram of FIG. 1.
FIG. 3 is a table indicating the torque capacity required of the torque transmitting devices of the transmission of FIGS. 1 and 2 during different speed ratios.

FIG. 1 shows a lever diagram of a transmission 10 in accordance with the invention. The mechanisms will be described with specific reference to the stick diagram of FIG. 2, wherein like reference numerals refer to like components from FIG. 1. Referring to FIGS. 1 and 2, the transmission 10 includes a first planetary gearset 14, a second planetary gearset 18, a third planetary gearset 22, and a fourth planetary gearset 26. Each of the planetary gearsets 14, 18, 22, 26 includes respective first, second, and third members.

More specifically, planetary gearset 14 includes a sun gear member 30, a ring gear member 34, and a planet carrier 38. Planet gears 40 are rotatably mounted with respect to the planet carrier 38 and are meshingly engaged with the ring gear member 34 and the sun gear member 30. Planetary gearset 18 includes a sun gear member 42, a ring gear member 46, and a planet carrier 50. Planet gears 52 are rotatably mounted with respect to the planet carrier 50 and are meshingly engaged with the ring gear member 46 and the sun gear member 42. Planetary gearset 22 includes a sun gear member 54, a ring gear member 58, and a planet carrier 62. Planet gears 64 are rotatably mounted with respect to the planet carrier 62 and are meshingly engaged with the ring gear member 58 and the sun gear member 54. Planetary gearset 26 includes a sun gear member 66, a ring gear member 70, and a planet carrier 74. Planet gears 76 are rotatably mounted with respect to the planet carrier 74 and are meshingly engaged with the ring gear member 70 and the sun gear member 66.

It should be noted that, where used in the claims, first, second, and third members of planetary gearsets do not necessarily refer to a member of a particular type; thus, for example, a first member may be any one of a ring gear member, sun gear member, or planet carrier assembly member. Similarly, as used in the claims, the respective first, second, or third members of two or more gearsets may or may not be the same type of member.

The transmission 10 also includes an input member 80 that is continuously operatively connected to the planet carrier 38 for unitary rotation therewith. An output member 84 is continuously operatively connected to the planet carrier 62 for unitary rotation therewith. Sun gear member 30 and sun gear member 66 are continuously operatively connected to one another for unitary rotation by interconnecting member 88. Planet carrier 50 and planet carrier 62 are continuously operatively connected to one another for unitary rotation by interconnecting member 92. Sun gear member 42 and ring gear member 34 are continuously operatively connected to one another for unitary rotation by interconnecting member 96. Planet carrier 74 and ring gear member 58 are continuously operatively connected to one another for unitary rotation by interconnecting member 100.

The transmission 10 also includes a plurality of torque transmitting devices that are selectively engageable to couple members of the planetary gearsets with the input member, the stationary member, or with other members of the planetary gearsets. Torque transmitting device 104 is a clutch that is configured to selectively couple the input member 80 and planet carrier 38 to ring gear member 54 for unitary rotation. Torque transmitting device 108 is a clutch that is configured to selectively couple interconnecting member 96, sun gear member 42, and ring gear member 34 to sun gear member 54 for unitary rotation. Torque transmitting device 112 is a clutch configured to selectively couple ring gear member 46 to sun gear member 54 for unitary rotation. Torque transmitting device 116 is a brake that is configured to selectively couple interconnecting member 88, sun gear member 30, and sun gear member 66 to a stationary member, such as transmission housing 118. Torque transmitting device 120 is a brake configured to selectively couple ring gear member 70 to the housing 118.

Referring to FIG. 3, a shift logic sequence for torque transmitting devices 104, 108, 112, 116, 120 is depicted that provides eight forward speed ratios and one reverse speed ratio between the input member 80 and the output member 84. Referring to FIGS. 1-3, a reverse speed ratio is achieved when torque transmitting devices 116, 120, and 112 are engaged and torque transmitting devices 108 and 104 are disengaged.

A first forward speed ratio is achieved when torque transmitting devices 116, 120, and 104 are engaged and torque transmitting devices 108 and 112 are disengaged. A second forward speed ratio is achieved when torque transmitting devices 116, 120, and 108 are engaged and torque transmitting devices 104 and 112 are disengaged. A third forward speed ratio is achieved when torque transmitting devices 120, 108, and 104 are engaged and torque transmitting devices 116 and 112 are disengaged. A fourth forward speed ratio is achieved when torque transmitting devices 120, 108, and 112 are engaged and torque transmitting devices 116 and 104 are disengaged. A fifth forward speed ratio is achieved when torque transmitting devices 120, 104, and 112 are engaged and torque transmitting devices 116 and 108 are disengaged. A sixth forward speed ratio is achieved when torque transmitting devices 108, 104, and 112 are engaged and torque transmitting devices 116 and 120 are disengaged. A seventh forward speed ratio is achieved when torque transmitting devices 116, 104, and 112 are engaged and torque transmitting devices 120 and 108 are disengaged. An eighth forward speed ratio is achieved when torque transmitting devices 116, 108, and 112 are engaged and torque transmitting devices 120 and 104 are disengaged.

Referring to FIG. 4, wherein like reference numbers refer to like components from FIGS. 1 and 2, torque transmitting device 120 is schematically depicted. Torque transmitting device 120 includes a plurality of evenly-spaced pressure plates 124 operatively connected to the housing 118. Torque transmitting device 120 also includes a plurality of discs 128 that are spaced apart from one another and operatively connected to the ring gear member 70. At least part of each plate 124 is disposed between two discs 128, as understood by those skilled in the art.

The torque transmitting device 120 also includes a piston 132 that is biased by a return spring, i.e., belleville spring 134, into a disengaged position as shown in FIG. 4. When the piston 132 is in the disengaged position, it does not act on the plates 124 and discs 128; thus the discs 128 and the ring gear member 70 are free to rotate with respect to the plates 124 and the housing 118. The piston 132 is selectively moveable axially into engagement with the plates 124 and discs 128, thereby compressing the plates 124 and discs 128 together such that the plates 124 and discs 128, and therefore the ring gear member 70 and the housing 118, cannot rotate with respect to each other.

The surface of the piston 132 is characterized by a first area 136 and a second area 140. The first area 136 cooperates with transmission structure 144 to define a first piston chamber 150, and the second area 140 cooperates with the transmission structure 144 to define a second piston chamber 154. The first and second chambers 150, 154 are in selective fluid communication with a source of pressurized fluid, such as the pump (shown at 160 in FIG. 4*a*).

More specifically, and with reference to FIGS. 4 and 4*a*, valve 164 is selectively moveable between open and closed positions. When valve 164 is in its open position, the first chamber 150 is in fluid communication with the pump 160 via conduit 168. When valve 164 is in its closed position, valve 164 prevents fluid communication between the pump 160 and the first chamber 150. Valve 172 is selectively moveable between open and closed positions. When valve 172 is in its open position, the second chamber 154 is in fluid communication with the pump via conduit 176. When valve 172 is in its closed position, valve 172 prevents fluid communication between the second chamber 154 and the pump 160. Valves 164, 172 include actuators, such as solenoids, to cause the valves 164, 172 to move between their respective open and closed positions. The valves 164, 172 are operatively connected to a controller 180 to be controlled thereby.

The transmission structure 144 defines three axially oriented surfaces 184, 188, 192. The piston 132 includes three axially oriented surfaces 196, 200, 204. Surfaces 184 and 196 are positioned to remain in contact with one another during axial translation of the piston 132; surfaces 188 and 200 are positioned to remain in contact with one another during axial translation of the piston 132; and surfaces 192 and 204 are positioned to remain in contact with one another during axial translation of the piston 132.

Chamber 150 is sealed by the contact between surfaces 184 and 196, and by contact between surfaces 188 and 200. Chamber 154 is sealed by contact between surfaces 188 and 200 and by contact between surfaces 192 and 204. Seals (not shown) may be employed between surfaces 184, 188, 192, 196, 200, 204 to further seal the first and second chambers 150, 154. The first and second chambers 150, 154 are not in fluid communication with one another; that is, fluid or fluid pressure from conduit 168 affects the first chamber 150 but not the second chamber 154. Similarly, fluid or fluid pressure from conduit 176 affects the second chamber 154 but not the first chamber 150. Accordingly, the first and second chambers 150, 154 may be separately and independently pressurized by the controller 180.

More specifically, by opening valve 164 and maintaining valve 172 in its closed position, the controller 180 causes the first chamber 150 to be pressurized while the second chamber 154 remains unpressurized. By opening valve 172 and maintaining valve 164 in its closed position, the controller 180 causes the first chamber 150 to remain unpressurized while the second chamber 154 is pressurized. The controller causes concurrent pressurization of both chambers 150, 154 by causing both valves 164, 172 to be concurrently open.

The first area 136 is arranged such that pressure in chamber 150 acts on the first area 136 to overcome the bias of the belleville spring 134 and move the piston 132 axially into engagement with the plates 124 and discs 128. Similarly, the second area 140 is arranged such that pressure in chamber 154 acts on the second area 140 to overcome the bias of the belleville spring 134 and move the piston 132 axially into engagement with the plates 124 and discs 128.

Pressurizing only one of the chambers 150, 154 results in less piston force, and therefore less torque capacity of the torque transmitting device 120, than pressurizing both of the chambers 150, 154. A given amount of pressure error with only one of the chambers 150, 154 pressurized results in a smaller amount of torque disturbance than the same amount of pressure error subjected to both chambers 150, 154.

Torque transmitting devices 116 and 112 are similar to torque transmitting device 120 in having respective pistons with separate chambers that may be separately and independently pressurized by controller 180. As shown in FIG. 3, relatively high torque capacity is required from torque transmitting device 116 for the reverse and first speed ratios, and relatively low torque capacity is required from torque transmitting device 116 for the second, seventh, and eighth speed ratios. Relatively high torque capacity is required from torque transmitting device 120 for the reverse, first, second and third speed ratios, and relatively low torque capacity is required from torque transmitting device 120 for the fourth and fifth speed ratios. Relatively high torque capacity is required from torque transmitting device 112 for the reverse speed ratio, and relatively low torque capacity is required from torque transmitting device 112 for the fourth, fifth, sixth, seventh, and eighth speed ratios.

Where a relatively high torque capacity is required from any of torque transmitting devices 116, 120, 112, the controller 180 is programmed to pressurize both piston chambers of the torque transmitting device. Where a relatively low torque capacity is required from any of torque transmitting devices 116, 120, 112, the controller 80 is programmed to pressurize only one of the piston chambers of the torque transmitting device.

More specifically, both of the chambers of the piston of torque transmitting device 116 are pressurized in the reverse and first speed ratios, and only one of the chambers of the piston of torque transmitting device 116 is pressurized while shifting into the second, seventh, and eighth speed ratios. Both of the chambers 150, 154 of the piston 132 of torque transmitting device 120 are pressurized in the reverse, first, second, and third speed ratios, and only one of the chambers 150, 154 of the piston 132 of torque transmitting device 120 is pressurized while shifting into the fourth and fifth speed ratios. Both of the chambers of the piston of torque transmitting device 112 are pressurized in the reverse speed ratio, and only one of the chambers of the piston of torque transmitting device 112 is pressurized while shifting into the fourth, fifth, sixth, seventh, and eighth speed ratios. It should be noted that, where only one chamber is pressurized during shifting, it may be desirable to pressurize both areas after the shift in order to reduce overall line pressure (pump pressure) for improved fuel economy.

Thus, for speed ratios where a large amount of clutch torque capacity is required to finish a shift, both piston chambers or areas will be pressurized. While shifting into speed ratios where smaller amounts of clutch torque capacity is required, only one of the chambers or areas will be pressurized. The result is that any pressure error induced torque disturbance is small compared to the torque required to complete the shift. In addition, using the smaller area to stroke the clutch reduces the oil volume needed to start the shift. The result is reduced shift delay.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; a stationary member;
first, second, third, and fourth planetary gearsets, each having respective first, second, and third members;
said first member of said first planetary gearset being continuously operatively connected to said first member of said second planetary gearset for unitary rotation;
said second member of said second planetary gearset being continuously operatively connected to said second member of said third planetary gearset for unitary rotation;
said third member of said first planetary gearset being continuously operatively connected to said third member of said fourth planetary gearset for unitary rotation;
said first member of said third planetary gearset being continuously operatively connected to said first member of said fourth planetary gearset for unitary rotation;
said second member of said first planetary gearset being continuously operatively connected to said input member for unitary rotation;
said second member of said third planetary gearset being continuously operatively connected to said output member for unitary rotation;
first, second, third, fourth, and fifth torque transmitting devices operative to selectively connect members of said planetary gearsets with said input member, said stationary member, or with other members of said planetary gearsets to provide at least eight forward speed ratios;
at least one of said torque transmitting devices including a piston partially defining first and second pressure chambers and being selectively moveable in response to hydraulic pressure in said pressure chambers.

2. The transmission of claim 1, further comprising a pump in selective fluid communication with said first and second pressure chambers.

3. The transmission of claim 2, further comprising at least one valve being selectively controllable to provide a first condition in which said first and second pressure chambers are in fluid communication with said pump; a second condition in which neither of said first and second pressure chambers are in fluid communication with said pump; and a third condition in which only one of said first and second pressure chambers is in fluid communication with said pump.

4. The transmission of claim 3, further comprising a controller operatively connected to said at least one valve and configured to control the operation thereof.

5. The transmission of claim 1, wherein said first torque transmitting device is configured to selectively couple said second member of said first planetary gearset and said input member with said third member of said third planetary gearset for unitary rotation;
wherein said second torque transmitting device is configured to selectively couple said first member of said first planetary gearset and said first member of said second planetary gearset with said third member of said third planetary gearset for unitary rotation;
wherein said third torque transmitting device is configured to selectively couple said third member of said second planetary gearset with said third member of said third planetary gearset for unitary rotation;
wherein said fourth torque transmitting device is configured to selectively ground said third member of said first planetary gearset and said third member of said fourth planetary gearset to said stationary member; and
wherein said fifth torque transmitting device is configured to selectively ground said second member of said fourth planetary gearset to said stationary member.

6. A transmission comprising:
an input member; an output member; a stationary member;
first, second, third, and fourth planetary gearsets, each having respective first, second, and third members; said first member of said first planetary gearset being continuously operatively connected to said first member of said second planetary gearset for unitary rotation; said second member of said second planetary gearset being continuously operatively connected to said second member of said third planetary gearset for unitary rotation; said third member of said first planetary gearset being continuously operatively connected to said third member of said fourth planetary gearset for unitary rotation; said first member of said third planetary gearset being continuously operatively connected to said first member of said fourth planetary gearset for unitary rotation; said second member of said first planetary gearset being continuously operatively connected to said input member for unitary rotation; said second member of said third planetary gearset being continuously operatively connected to said output member for unitary rotation; and
first, second, third, fourth, and fifth torque transmitting devices operative to selectively connect members of said planetary gearsets with said input member, said stationary member, or with other members of said planetary gearsets to provide at least eight forward speed ratios;
at least one of said torque transmitting devices including a plurality of plates mounted with respect to one of said members of said planetary gearsets or said stationary member, a plurality of disks mounted with respect to another of said members of said planetary gearsets or said stationary member, and a piston partially defining two separate pressure chambers and being selectively moveable in response to hydraulic pressure in said pressure chambers to engage said plates with said disks.

7. A transmission comprising:
an input member; an output member; a stationary member;
first, second, third, and fourth planetary gearsets, each having respective first, second, and third members;
said first member of said first planetary gearset being continuously operatively connected to said first member of said second planetary gearset for unitary rotation;
said second member of said second planetary gearset being continuously operatively connected to said second member of said third planetary gearset for unitary rotation;
said third member of said first planetary gearset being continuously operatively connected to said third member of said fourth planetary gearset for unitary rotation;
said first member of said third planetary gearset being continuously operatively connected to said first member of said fourth planetary gearset for unitary rotation;
said second member of said first planetary gearset being continuously operatively connected to said input member for unitary rotation;
said second member of said third planetary gearset being continuously operatively connected to said output member for unitary rotation;
a first torque transmitting device being configured to selectively couple said second member of said first planetary gearset and said input member with said third member of said third planetary gearset for unitary rotation;
a second torque transmitting device being configured to selectively couple said first member of said first planetary gearset and said first member of said second planetary gearset with said third member of said third planetary gearset for unitary rotation;
a third torque transmitting device being configured to selectively couple said third member of said second planetary gearset with said third member of said third planetary gearset for unitary rotation;
a fourth torque transmitting device being configured to selectively ground said third member of said first planetary gearset and said third member of said fourth planetary gearset to said stationary member; and
a fifth torque transmitting device being configured to selectively ground said second member of said fourth planetary gearset to said stationary member;
wherein each of said third, fourth, and fifth torque transmitting devices includes a respective piston that partially defines respective first and second chambers and is configured to move in response to pressure in said respective first and second chambers.

8. The transmission of claim 7, further comprising a pump configured to supply pressurized fluid; a plurality of valves configured to selectively control the pressure from the pump in each of said chambers partially defined by said pistons; and a controller being configured to control said valves.

* * * * *